(12) United States Patent
Gaidar et al.

(10) Patent No.: US 10,592,639 B2
(45) Date of Patent: Mar. 17, 2020

(54) BLOCKCHAIN-BASED SHADOW IMAGES TO FACILITATE COPYRIGHT PROTECTION OF DIGITAL CONTENT

(71) Applicant: Intel Corporation, Santa Clara, CA (US)

(72) Inventors: Tamara Gaidar, Haifa (IL); Eran Birk, Haifa (IL); Nava Levy, Haifa (IL); Glen J. Anderson, Beaverton, OR (US); Ned M. Smith, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 649 days.

(21) Appl. No.: 15/256,964

(22) Filed: Sep. 6, 2016

(65) Prior Publication Data
US 2018/0068091 A1   Mar. 8, 2018

(51) Int. Cl.
*G06F 21/10* (2013.01)
*G06F 21/16* (2013.01)

(52) U.S. Cl.
CPC .............. *G06F 21/10* (2013.01); *G06F 21/16* (2013.01); *G06F 2221/0733* (2013.01)

(58) Field of Classification Search
CPC .................................................. G06F 21/10
USPC ........................................................ 726/26
See application file for complete search history.

(56) References Cited

U.S. PATENT DOCUMENTS

| 8,924,727 B2 | 12/2014 | Smith et al. |
| 2009/0240923 A1 | 9/2009 | Covey et al. |
| 2009/0313135 A1* | 12/2009 | Dobbelaere ........ G06Q 30/0601 705/26.1 |
| 2010/0007710 A1* | 1/2010 | Miyaso ................ B41J 29/393 347/110 |
| 2011/0087690 A1* | 4/2011 | Cairns ................ G06F 21/6218 707/769 |
| 2012/0163589 A1 | 6/2012 | Johnson et al. |

(Continued)

FOREIGN PATENT DOCUMENTS

WO    2015/099698 A1    7/2015

OTHER PUBLICATIONS

U.S. Appl. No. 14/863,918, filed on Sep. 24, 2015, 48 pages.

(Continued)

*Primary Examiner* — Peter C Shaw
(74) *Attorney, Agent, or Firm* — Barnes & Thornburg LLP

(57) ABSTRACT

A client platform supports digital rights management. The client platform comprises a digital rights management (DRM) engine which, when executed, enables the client platform to monitor download operations performed by the client platform and to obtain a shadow image for a digital content item from a DRM blockchain, in response to an operation to download the digital content item from a remote source. The shadow image comprises a hash of the digital content item and copyright policy settings to indicate security constraints for the digital content item. The client platform may automatically determine whether the copyright policy settings for the digital content item allow modification of the digital content item. A user may be allowed to create a modified version of the digital content item only if the copyright policy settings allow modification of the digital content item. Other embodiments are described and claimed.

21 Claims, 4 Drawing Sheets

(56) References Cited

U.S. PATENT DOCUMENTS

| | | | |
|---|---|---|---|
| 2013/0013928 A1 | 1/2013 | Thom et al. | |
| 2013/0042295 A1 | 2/2013 | Kelly et al. | |
| 2013/0311764 A1 | 11/2013 | Alpert et al. | |
| 2015/0281186 A1 | 10/2015 | Smith et al. | |
| 2017/0193001 A1* | 7/2017 | Agrawal | G06F 3/04817 |
| 2017/0220815 A1* | 8/2017 | Ansari | G06F 21/64 |
| 2018/0121635 A1* | 5/2018 | Tormasov | G06F 21/645 |

OTHER PUBLICATIONS

Edwards et al., "Protecting Sensor Data From Malware Attacks", Intel Technology Journal, vol. 18, No. 4, Jul. 2014, pp. 2, 178-197.
Intel Security, "McAfee Safeguards Facebook Photos With McAfee Social Protection", Available online at <http://www.mcafee.com/us/about/news/2012/q3/20120828-01.aspx>, Aug. 28, 2012, 2 pages.
International Preliminary Report on Patentability and Written Opinion Received for PCT Application No. PCT/US2013/077656, dated Jul. 7, 2016, 11 pages.
International Search Report and Written Opinion received for PCT Application No. PCT/US2013/077656, dated Sep. 26, 2014, 12 pages.
Wikipedia, "Blockchain (Database)", Available online at <https://en.wikipedia.org/wiki/Block_chain_(database)>, 9 pages.

* cited by examiner

BLOCKCHAIN-BASED SHADOW IMAGES TO FACILITATE COPYRIGHT PROTECTION OF DIGITAL CONTENT

TECHNICAL FIELD

This disclosure pertains in general to digital rights management (DRM), and in particular to blockchain-based shadow images to facilitate copyright protection of digital content.

BACKGROUND

With today's technology, it is relatively easy for people to create content and to share that content around the world. For instance, a person may become a content creator by simply taking a picture or a video with a smartphone, or by posting a comment to a social media website. And numerous different content sharing services on the Internet enable people to share content around the world. A small sample of such content sharing services includes those known by names or trademarks such as YouTube, Vimeo, and Facebook.

In addition, the content creator may be entitled to copyright protection for the content that he or she creates. Furthermore, the content creator might not want other people to reuse his or her content at all, or the content creator might at least want to be acknowledged as the creator. In addition or alternatively, the content creator might want to be compensated for use of the content. However, with conventional technology, it may be difficult or impossible to actually put copyright protection into effect for content that has been shared electronically. For instance, it may be difficult or impossible to conclusively determine who the creator of the content was. It may also be difficult or impossible to prevent others from copying and modifying the content. And for modified content, it may be difficult or impossible to conclusively determine which parts were modified and by whom.

As described in greater detail below, the present disclosure introduces technology to facilitate copyright protection of digital content.

DESCRIPTION OF EMBODIMENTS

Figure 1:
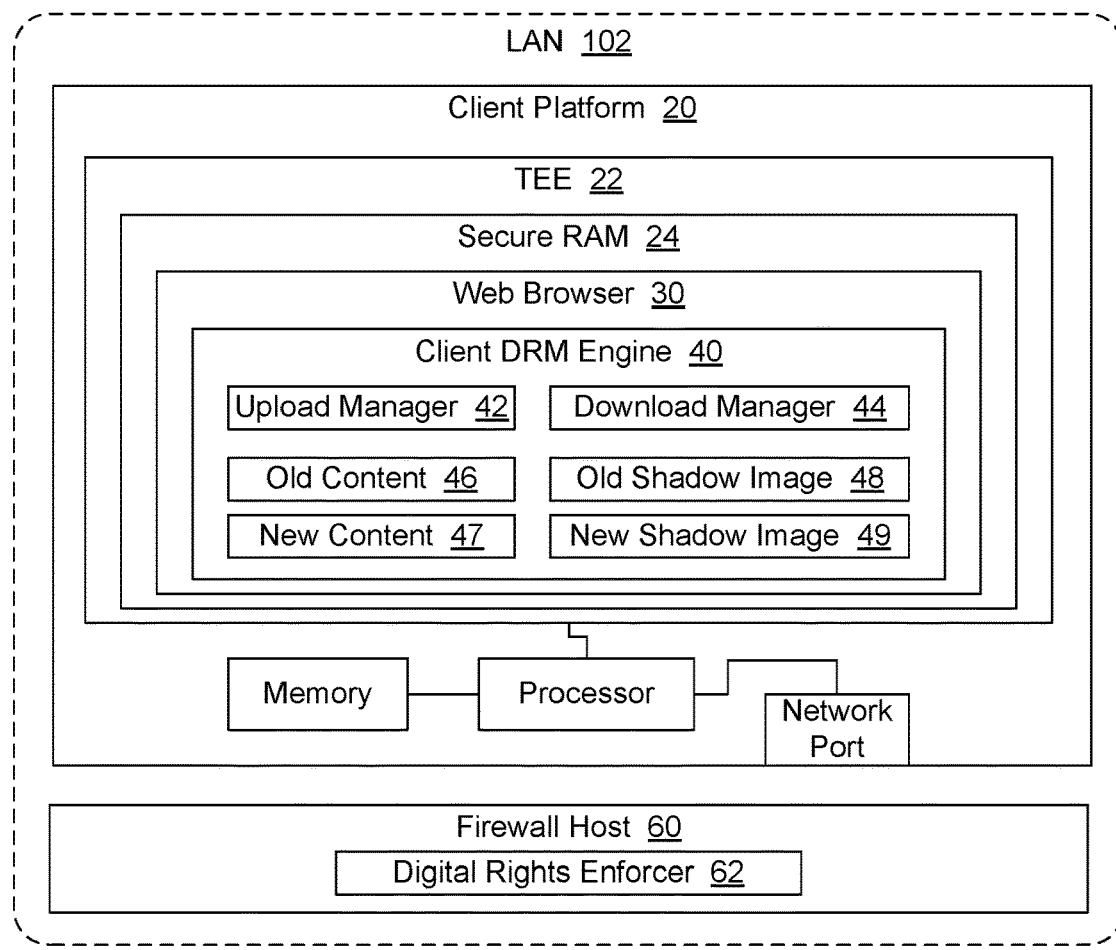
FIG. 1 is a block diagram of an example embodiment of a distributed data processing system that uses blockchain-based shadow images to facilitate copyright protection of digital content.
Figure 1:
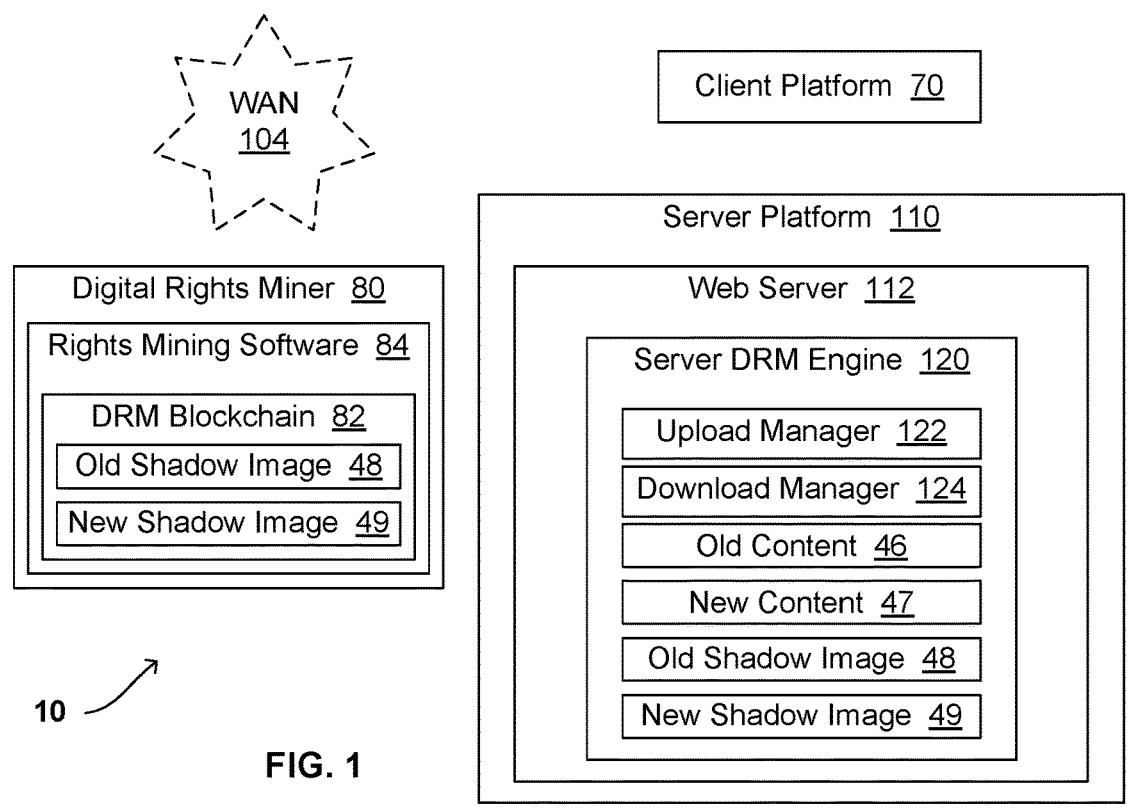

As indicated above, the present disclosure introduces technology to facilitate copyright protection of digital content. In particular, as described in greater detail below, blockchain technology is used to document and verify attributes of digital content that are relevant to copyright protection. Such attributes may include, for instance, an identifier for the author of the content, a timestamp to indicate when the content was created, and a measurement that can subsequently be used to detect copying or modification of the content.

For purposes of this disclosure, a blockchain is a distributed database or data structure which adheres to a predetermined protocol that requires the blocks (a) to be linked together and (b) to use a specified structure or layout. The database is said to be distributed because no single device or person ultimately controls the database. Instead, control is based on operations that are performed by multiple independent nodes within the blockchain system. Multiple different data processing systems may each contain a copy of the database, and multiple different data processing systems may each modify the database, by adding new blocks to it.

A blockchain may include all valid blocks that have ever been created for that blockchain. Accordingly, a blockchain may contain a set of blocks that is continuously growing, and each block (except for the so-called "genesis block") may refer to the previous block in the set. A blockchain may thus be hardened against tampering and revision.

The data processing systems which cooperate to support and use a particular blockchain may be referred to collectively as a "blockchain system" and individually as "nodes." Also, the operations associated with generating new blocks and updating the blockchain may be referred to as "mining," and the data processing systems which perform those operations may be referred to as "miners." To update a blockchain, a miner may create a new block for the end of the blockchain, and the miner may then publish or broadcast that new block to other nodes in the blockchain system. Each node in a blockchain system may include a copy of the entire blockchain or a portion of the blockchain (such as the last few blocks).

A block in a blockchain may contain one or more transactions. According to the present disclosure, nodes may create transactions to document attributes of digital content that are relevant to copyright protection of that content. For instance, when a user of a data processing system creates content, the data processing system may also create a separate data structure that contains information about the content that may be relevant to copyright protection. For purposes of this disclosure, that data structure may be referred to as a "shadow image." As described in greater detail below, such a shadow image may be saved in the blockchain as a transaction (or as part of a transaction), to provide verifiable evidence concerning who authored the content, when the content was created, etc. For purposes of this disclosure, a blockchain containing shadow images with information that is relevant to copyright protection may be referred to as a "DRM blockchain."

In addition, each transaction record may be timestamped and digitally signed by the device which created it. After a device creates a transaction record, the device may send it to other nodes in the blockchain the Internet, the "cloud," or any other suitable connection. A miner may then create a new block record containing that transaction record, possibly along with other transaction records. In addition, the miner may include a hash of (some or all of) the prior block in the new block, thus linking the blocks together into a chain. Blocks may confirm when and in what sequence transactions are recorded in the blockchain.

For purposes of this disclosure, the term "content" refers to digital or electronic information that was produced at least in part by a person. Such digital information may include conventional computer files which, when rendered by a data processing system, produce output that can be detected by a human. Such output may include, without limitation, text, drawings, photographs, audio output, and video output or "moving pictures" (with or without accompanying audio output). In addition, such digital information may include streaming formats and other formats that are not implemented or provided as a computer file. For purposes of this disclosure, content that is embodied in a computer file may be referred to as "structured content." Content that is not embodied in a computer file may be referred to as "unstructured content." Content that is included in a computer file along with other content may also be referred to as "unstructured content." Moreover, content may be structured on one device and unstructured on another device. For instance, a first user with video content embodied in a video file on a first client platform may upload that file to a server platform of a content sharing service such as YouTube. The server platform and the first client platform may each store the video in a file, as structured content. However, a second user at a second client platform may view the video content by streaming it from the server platform. The video content may be embodied as unstructured content on the second client platform. In other words, the second client platform may never obtain a file which includes all of the video content.

Also, the second user may take a screen shot while the video is streaming. That screen shot may include a frame of the video, along with other information, such as interface elements presented by the content sharing service, images from other applications, etc. The user may then save that screen shot as an image file. Accordingly, the image file may contain multiple pieces of content, including content from different authors. When a single file contains multiple pieces of content, each of those pieces of content may also be referred to as "unstructured." Similarly, an author may type in an original poem into a social media website (e.g., as a status update), and the social media website may subsequently present that poem on client systems being operated by friends of the author, possibly along with many other types of content. However, the poem may never exist as an independent computer file. The poem may therefore be referred to as "unstructured content" in the context of the clients and the context of the social media server.

The present disclosure introduces a DRM system that uses a distinct shadow image for each piece of content, with the shadow image providing information about the content that may be relevant to copyright protection, as indicated above. For instance, a shadow image may provide verifiable evidence concerning who authored the content, when the content was created, etc. In addition, the shadow image for each piece of content is stored in a DRM blockchain that may be accessible via the Internet, for instance via a cloud server.

For purposes of this disclosure, a piece of content that has a corresponding shadow image in a DRM blockchain may be referred to as "blockchain protected content." Thus, each item of blockchain protected content has a shadow image in a DRM blockchain. In addition, as described in greater detail below, a DRM engine enables a client platform to obtain the shadow image for a content item from a node in the blockchain system. The DRM engine also checks the content item against the shadow image to verify that they match. If the current user then modifies the content, the DRM engine ensures that those changes are added to the DRM blockchain. If the DRM engine fails to update the DRM blockchain, then all changes made by the current user may be considered to be lost, since the modified content with not be verifiable by other users or devices. Similarly, if the DRM engine is unable to obtain a shadow image for a particular content item, the DRM engine may prevent the current user from modifying that content.

FIG. 1 is a block diagram of an example embodiment of a distributed data processing system 10 that uses blockchain-based shadow images to facilitate copyright protection of digital content. Accordingly, distributed data processing system 10 may also be referred to as "blockchain system 10." In the embodiment of FIG. 1, blockchain system 10 includes a client platform 20 and a firewall host 60 which communicate with each other via a local area network (LAN) 102. Blockchain system 10 also includes a server platform 110 and a digital rights miner 80. As described in greater detail below, digital rights miner 80 may use rights mining software 84 to add shadow images to a DRM blockchain 82. For purposes of this disclosure, a digital rights miner may be referred to simply as a "miner."

A wide area network (WAN) 104, such as the Internet, may be used for communications between client platform 20, server platform 110, and miner 80. As described in greater detail below, firewall host 60 may filter communications between client platform 20 and devices outside of LAN 102.

As illustrated, client platform 20 includes one or more processors in communication with memory and in communication with one or more network ports. Each of the other data processing devices in blockchain system 10 may include the same or similar hardware resources. The devices may also include software components for implementing the features described herein. The devices may load the software into the memory and then execute that software to perform the operations described herein.

For instance, client platform 20 may include a client DRM engine 40 that creates shadow images to facilitate copyright protection of digital content, as described in greater detail below. In the embodiment of FIG. 1, client DRM engine 40 is part of a web browser 30. For instance, client DRM engine 40 may be a plug-in component of web browser 30, and DRM engine 40 may include an upload manager 42 and a download manager 44. As described in greater detail below, upload manager 42 may facilitate copyright protection for content uploaded from client platform 20 to other devices, and download manager 44 may facilitate copyright protection for content downloaded to client platform 20 from other devices. In addition, client platform 20 may execute client DRM engine 40 in a trusted execution environment (TEE) 22. For instance, client DRM engine 40 may execute from secure random access memory (RAM) 24 within TEE 22. However, in alternative embodiments, different approaches may be used to implement a client DRM engine.

In an example scenario, blockchain system 10 includes at least one additional client platform 70. Client platform 70 may include components like those illustrated in client platform 20. Other embodiments may feature additional client platforms, server platforms, and DRM miners, as well as other types of networks, or any other suitable variations.

The software that firewall host 60 executes may include a digital rights enforcer 62 which ensures that client platform 20 does not upload content that violates copyright policies for that content. For instance, digital rights enforcer 62 may perform operations like those described below with regard to the upload managers and the download managers. Consequently, even if protection were to be disabled on the client platforms, firewall host 60 may prevent the client platforms from violating the copyright policies associated with content items that the client platforms are trying to upload or download.

The software that server platform 110 executes may include a web server 112 with a server DRM engine 120. Server DRM engine 120 may include an upload manager 122 and a download manager 124. Upload manager 122 may facilitate copyright protection for content uploaded to server platform 110 from other devices, and download manager 124 may facilitate copyright protection for content downloaded from server platform 110 to other devices. Firewall host 60 may execute digital rights enforcer 62 in a TEE, server platform 110 may execute server DRM engine 120 in a TEE, and miner 80 may execute rights mining software 84 in a TEE. As described in greater detail below, client DRM engine 40, server DRM engine 120, digital rights enforcer 62, and rights mining software 84 enable the respective platforms within blockchain system 10 to manage attributes of digital content that are relevant to copyright protection.

TEE 22 in client platform 20 (and corresponding TEEs on other platforms) may provide an isolated execution environment, providing security features such as isolated execution, integrity of trusted applications, and confidentiality of data used by those applications. Further details on the features of a TEE may be found in the article by the GlobalPlatform association entitled "GlobalPlatform made simple guide: Trusted Execution Environment (TEE) Guide" ("The TEE Guide"). For instance, the TEE Guide (which is currently available at www.globalplatform.org/mediaguidetee.asp) explains as follows:

> The TEE is a secure area of the main processor in a [device]. It ensures that sensitive data is stored, processed and protected in an isolated, trusted environment. The TEE's ability to offer isolated safe execution of authorized security software, known as 'trusted applications', enables it to provide end-to-end security by enforcing protected execution of authenticated code, confidentiality, authenticity, privacy, system integrity and data access rights. Comparative to other security environments on the device, the TEE also offers high processing speeds and a large amount of accessible memory.
>
> The TEE offers a level of protection against attacks that have been generated in the Rich [operating system (OS)] environment. It assists in the control of access rights and houses sensitive applications, which need to be isolated from the Rich OS. For example, the TEE is the ideal environment for content providers offering a video for a limited period of time, as premium content (e.g. HD video) must be secured so that it cannot be shared for free.

In addition, with regard to the security infrastructure of a data processing system or device, the TEE Guide describes a framework with the following three environments. One of those environments is the TEE. The other two are described as follows:

> Rich OS: An environment created for versatility and richness where device applications . . . are executed. It is open to third party download after the device is manufactured. Security is a concern here but is secondary to other issues.
>
> [Secure Element (SE)]: The SE is a secure component which comprises autonomous, tamper-resistant hardware within which secure applications and their confidential cryptographic data (e.g. key management) are stored and executed. It allows high levels of security, but limited functionality, and can work in tandem with the TEE. The SE is used for hosting proximity payment applications or official electronic signatures where the highest level of security is required. The TEE can be used to filter access to applications stored directly on the SE to act as a buffer for Malware attacks.

In the embodiment of FIG. 1, TEE 22 is implemented as an isolated processing core that also contains protected storage, along with control logic that ensures the integrity of software executing in the TEE. The protected storage may include volatile memory such as secure random access memory (RAM) 24 (which may be implemented as static RAM (SRAM), for instance) and nonvolatile or persistent memory such as secure storage. TEE 22 protects the data in the protected storage from being accessed by any software or other components outside of TEE 22, including software operating at the operating system (OS) level. TEE 22 may also prevent software in TEE 22 from affecting components outside of TEE 22. TEE 22 may be implemented as a service processor or a security coprocessor, for instance. In addition, TEE 22 may serve as a trusted platform module (TPM). Accordingly, client platform 20 may store sensitive data or "secrets" (e.g., keys and credentials) in the protected storage of TEE 22. For instance, client platform 20 may store a signing key and other device credentials for client platform 20 in the secure storage.

In other embodiments, a main processor may use specialized instructions (a) to create a TEE that uses main memory and (b) to utilize that TEE. For instance, to create and utilize a TEE, a device may use the technology provided by Intel Corporation under the name or trademark "Intel Software Guard Extensions" or "Intel SGX," or the technology provided by ARM Ltd. under the name or trademark "ARM TrustZone."

Figure 2:
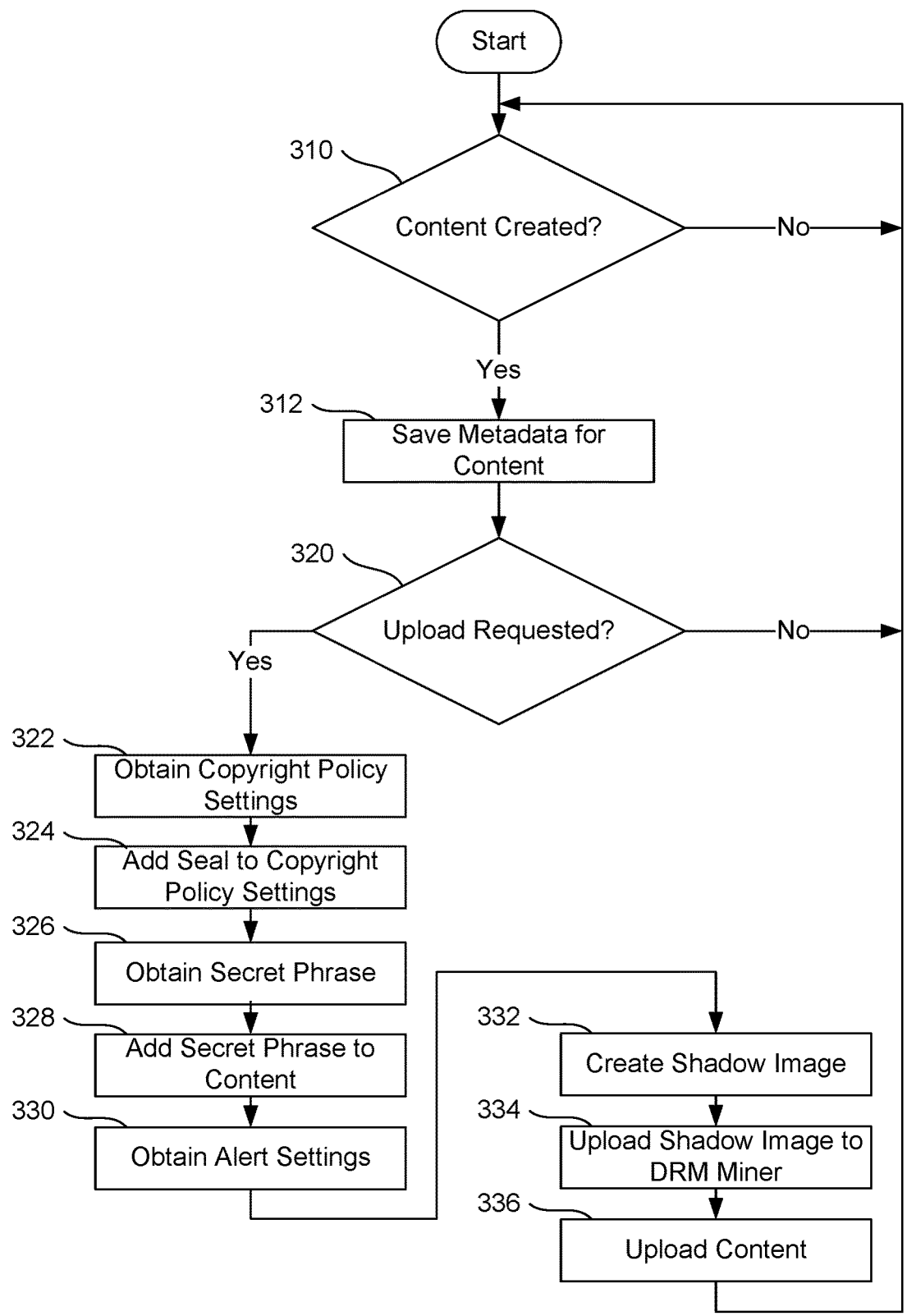
FIG. 2 is a flowchart of an example process to facilitate copyright protection of new digital content.

FIG. 2 is a flowchart of an example process to facilitate copyright protection of new digital content. That process may begin with a client DRM engine in client platform 70 determining whether the user of client platform 70 has created new digital content. The client DRM engine may be implemented as an agent that runs in the background of an Internet browser (e.g., as a plug-in). As indicated above, the client DRM engine may include an upload manager and a download manager. The upload manager may intercept all of the upload traffic from client platform 70, and the download manager may intercept all of the download traffic of client platform 70.

If the user has created new content, the client DRM engine may save metadata for that new content, as shown at block 312. That metadata may include some or all of the items described below with regard to FIG. 4.

An upload manager in the client DRM engine may then determine whether client platform 70 is trying to upload the new content to a remote data processing system, as shown at block 320. If client platform 70 is trying to upload the new content to a remote data processing system, the upload manager may obtain copyright policy settings for the new content, as shown at block 322. For instance, the upload manager may prompt the user to enter those copyright policy settings. Those settings may specify security constraints set by the author of the digital content. For instance, the copyright policy settings may specify one or more of the following restrictions, which may be applied to all users other than the author, to selected individual users, or to selected groups of users:

who has permission to download the content,
who has permission to view the content,
who has permission to redistribute the content,
who has permission to combine or "mashup" the content with other content then redistribute the resulting content,
who has permission to edit the content, who has permission to sell the content,
who has permission to distribute the content over a defined geographical area,
age restriction for content consumption (e.g. do not allow viewing for users under the age of 21), and
what types of use are allowed and/or prohibited.

Additionally, many different restrictions or requirements may be set, in terms of allowed and prohibited uses. Those restrictions and requirements may include without limitation, one or more of the following:

the content item may be shared by others for free, but nor for compensation (in other words, commercial use is not allowed);
the content item may be shared, but only of the shared version includes visible attribution to the original author;
the content item may be shared, but only of the shared version includes visible attribution to the original author; and
the content item may be shared, but only with the same copyright policy settings that were specified by the original author.

As shown at block 324, the upload manager may then use a digital signature for the user to seal the copyright policy settings.

As shown at block 326, the upload manager may also obtain a secret phrase from the user, to serve as evidence that the user was the author of the content. For instance, the upload manager may prompt the user to enter a phrase that contains intentional spelling mistakes, to serve as authentication evidence of something only the author would know. Accordingly, the phrase may be considered authentication information. As shown at block 328, the upload manager may then add the secret phrase as an invisible part of the content. The invisible secret phrase may also be referred to as a "secret watermark" or as an "invisible watermark." In addition, even though the secret watermark may not be visible to people perceiving the content, the secret watermark may be detectable to Internet search engines. Consequently, as described in greater detail below, search engines or other tools may use the secret watermarks to determine whether content from particular authors has been copied to servers on the Internet.

As shown at block 330, the upload manager may then obtain alert settings from the user, to indicate whether the user is to be notified when other users access or modify the content, or when the content is found on the Internet. Additional information concerning alerts is provided below.

As shown at block 332, the upload manager may then create a shadow image for the new content. The shadow image may include some or all of the metadata for the new content, such as the copyright policy settings, the alert settings, etc. Thus, the upload manager may register a user-defined set of preferred policies (e.g., do not download, do not change) in the shadow image. And, as indicated below, the upload manager 42 may connect that set of policies to the content by associating the shadow image with the content before uploading the content to the Internet. For instance, upload manager 42 may create a content identifier (see FIG. 4) to uniquely identify the new content item, and upload manager 42 may include that content identifier as part of the shadow image. Subsequently, when a client platform downloads the new content, the download manager in that client platform may use the content identifier to find the shadow image for the new content in DRM blockchain 82.

Upload managers and download managers may use any suitable technique to generate content identifiers. For instance, for structured content, a client DRM engine may hash the substantive content, and the client DRM engine may use the hash result as the content identifier. Alternatively, for structured or unstructured content, a client DRM engine may hash portions or samples of the substantive content, and the client DRM engine may generate the content identifier based on those hash results. For instance, the client DRM engine may compute a series of hash values, and the client DRM engine may include a previous hash result with the next sample, so that the final hash identifies or represents the entire stream. Alternatively, unstructured content may involve a manifest file that contains multiple webpages, images, and other files, and the client DRM engine may use a hash of the manifest file as the content identifier.

Also, the technique used to generate a content identifier may depend on the content type. Different hashing algorithms may be used for different types of data. For example, for a photograph, the upload manager and download manager might hash the pixel values, excluding Exchangeable Image File Format (EXIF) metadata. For an audio file, they may hash a subset of the audio stream, according to a predetermined set of offsets and lengths. For a video file, they may hash portions of the video and audio tracks. And so on.

Further details for an example shadow image are provided below with regard to FIG. 4. A shadow image may also be referred to as a "shadow record."

As shown at block 334, the upload manager may then upload the shadow image to one or more other nodes of blockchain system 10, to be included in DRM blockchain 82. For example, the upload manager may send the shadow image as a blockchain transaction, or as part of a blockchain transaction, to a DRM miner such as miner 80. Consequently, miner 80 (or another miner in blockchain system 10) receives the shadow image and uses rights mining software 84 to add the shadow image to DRM blockchain 82. For instance, miner 80 may create a new block for DRM blockchain 82, and that new block may include the shadow image as a blockchain transaction.

Blockchain system 10 may use a trusted method for updating DRM blockchain 82, to deter or prevent attackers from using a man-in-the-middle (MITM) attack to substitute, inject, or replace information communicated between the client DRM engine and the rights mining software. For example, client platform 70 may use an encrypted channel to send the shadow image to miner 80. Such channels may use any suitable protocol, include without limitation Transport Layer Security (TLS), Datagram TLS (DTLS), sigma, etc. In another embodiment, the client platform that is uploading the content also includes rights mining software for adding shadow images to the DRM blockchain, and the rights mining software is tightly integrated into the TEE containing the client DRM engine. Alternatively, the client platform may include the rights mining software, and client DRM engine communicates with the rights mining software via a secure bus architecture, such as the Advanced Microcontroller Bus Architecture (AMBA) or the Intel On-chip System Fabric (IOSF), for instance. In addition or alternatively, the blockchain system may use a two-phase commit protocol to update the DRM blockchain.

As shown at block 336, after uploading the shadow image, the upload manager may then allow the content to be uploaded to the remote data processing system.

Referring again to FIG. 1, for purposes of illustration, this disclosure presents a hypothetical scenario involving old content 46, new content 47, old shadow image 48, and new shadow image 49. In particular, according to the hypothetical scenario, the user of client platform 70 has uploaded old content 46 to server platform 110 and old shadow image 48 to miner 80, as described above with regard to FIG. 2. Also, miner 80 has added old shadow image 48 to DRM blockchain 82, as described above with regard to FIG. 2.

As described in greater detail below, a second user at client platform 20 may subsequently obtain the content that was created by the first user, and the second user may modify that content. Accordingly, the content that was created by the first user may be referred to as "old content 46," and the modified content from the second user may be referred to as "new content 47." Similarly, the shadow image for old content 46 may be referred to as "old shadow image 48," and the shadow image for new content 47 may be referred to as "new shadow image 49."

In particular, according to the hypothetical scenario, server platform 110 hosts a social media website known (hypothetically) as "Keep In Touch" or "KIT." Also, the user of client platform 20 (referred to above as the "second user") is Dan, and he has three friends: Adam, Bob, and Cory. Adam (referred to above as the "first user") has already used client platform 70 to upload a content item to KIT (as described above with regard to FIG. 2). Similarly, Bob and Cory have used other client platforms to upload other content items to KIT.

Specifically, Adam uploaded a picture he had taken of a puppy, and Adam set the copyright policy settings to allow all others to modify and share that picture without restrictions. Accordingly, server platform 110 stored that picture in old content 46 as "substantive content" (see FIG. 4), and miner 80 added the corresponding policy settings to DRM blockchain 82 as "copyright policy settings" in old shadow image 48 (see FIG. 4).

Also, Bob uploaded a video that he had taken of paint drying, and Bob set the copyright policy settings for that video to prohibit modification, commercial use, or downloading of the video. For purposes of this disclosure, a prohibition on downloading of content means the content is not to be downloaded as structured content, but may be downloaded as streaming content or as any other form of content that cannot readily be saved on the client platform. Cory uploaded a poem that he drafted by simply typing the poem into a "status update" field for his KIT homepage and then clicking a "share" button. The upload manager in his client platform then prompted Cory to enter copyright policy settings, and Cory specified that the poem could be modified by any of the people considered friends of Cory by KIT, but not by anyone else.

Figure 3:
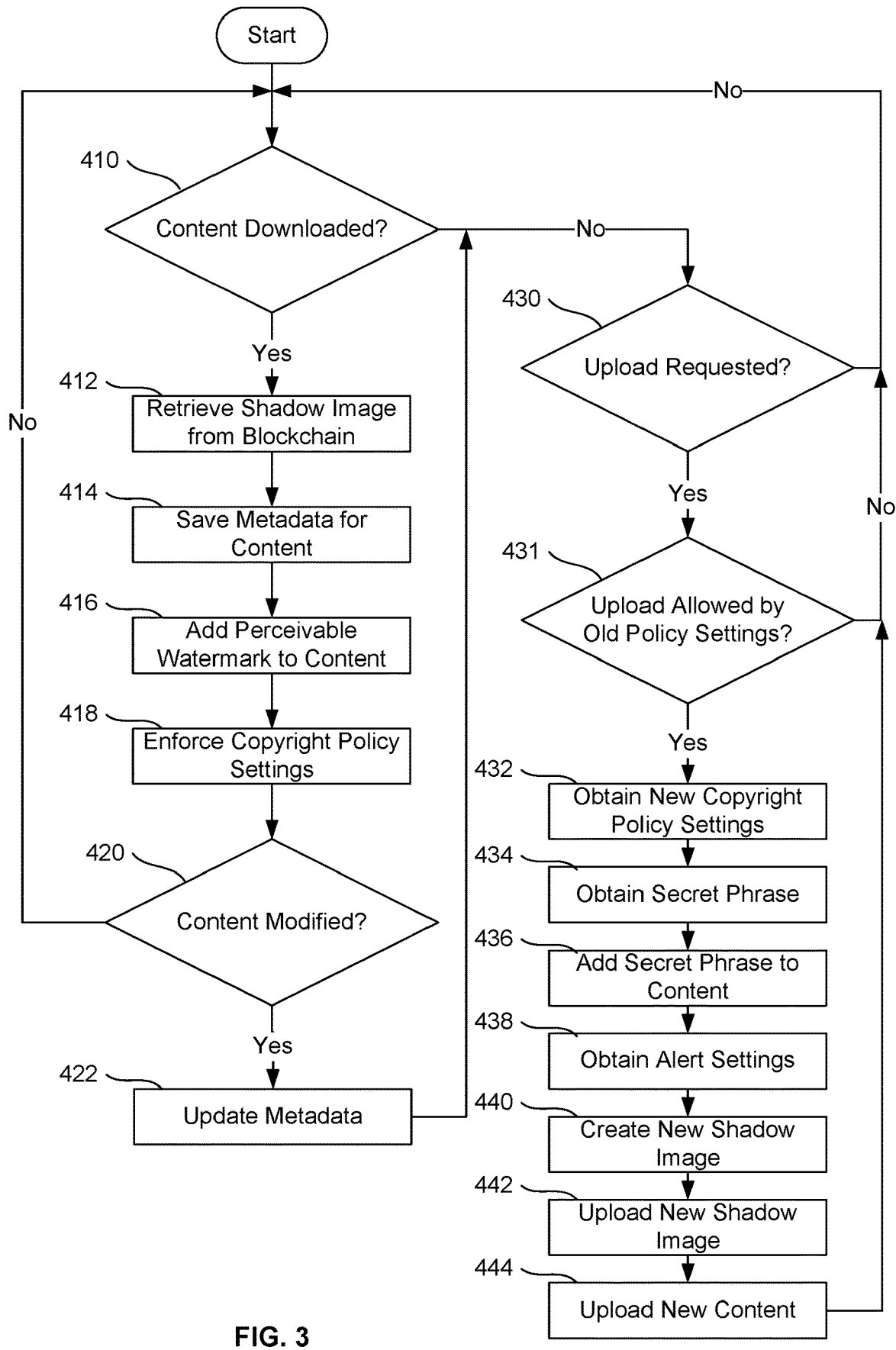
FIG. 3 is a flowchart of an example process to facilitate copyright protection of existing digital content.

FIG. 3 is a flowchart of an example process to facilitate copyright protection of existing digital content. For purposes of illustration, this process involves a hypothetical scenario involving old content 46, new content 47, old shadow image 48, and new shadow image 49, as indicated above. In particular, according to the process of FIG. 4, Adam has already used client platform 70 to upload old content 46 to server platform 110 and old shadow image 48 to miner 80. Also, miner 80 has added old shadow image 48 to DRM blockchain 82.

As shown at block 410, download manager 44 in client platform 20 may then determine whether the user of client platform 20 (in this case, Dan) is downloading content from a remote data processing system. In the hypothetical scenario, download manager 44 automatically makes a determination of whether client platform 20 is downloading content in response to web browser 30 attempting to download Adam's homepage from KIT's server platform 110. And in the hypothetical scenario, server platform 110 has included in that home page content from some of Adam's friends, including the picture from Adam, a dynamic link to a streaming version of the video from Bob, and a textual copy of the poem from Cory.

In other scenarios, the user of the client platform may be using an email application to download an email message that includes an image from an email server, or the user may be using any other suitable application to download content from a remote device.

In the example scenario, client platform 20 is downloading a webpage from a server for a social media website, and that webpage includes an image and other content items. Consequently, download manager 44 may parse the webpage to determine or extract each of those content items, in response to determining that content is being downloaded. Webpages—and other sources of unstructured content—may include supplemental data to help the download manager to parse that webpage to recognize the unstructured content items within the webpage. The supplemental data may include a manifest, metadata, and/or invisible markup tags to identify the different items of unstructured content. In other words, a source of unstructured content may be instrumented with metadata using a manifest or with invisible markup. At least one form of metadata may include a backward reference to the author or origin of each content item.

As shown at block 412, download manager 44 may then automatically retrieve the shadow image for each of those content items.

Thus, when download manager 44 intercepts downloaded content, download manager 44 may automatically obtain the corresponding shadow image from DRM blockchain 82. For instance, in the example scenario where old content 46 denotes the picture from Adam, download manager 44 automatically computes a content identifier for old content 46 (e.g., using a hash function), and download manager 44 then uses that content identifier to retrieve the corresponding old shadow image 48. For example, download manager 44 may retrieve the most current version of DRM blockchain 82 from another node in blockchain system 10 such as miner 80, if necessary, and download manager 44 may then use the content identifier to extract old shadow image 48 from DRM blockchain 82.

Alternatively, when providing a client with unstructured content within a source such as a webpage, a server platform may also provide a manifest structure (e.g., a web archive file, a zip image or any other suitable archival structure) that combines multiple content items into a package that has a single shadow image.

Client DRM engine 40 may also cache DRM blockchain 82 and/or shadow images, to avoid the need to retrieve old shadow images for content that was recently processed by client platform 20.

As shown at block 414, download manager 44 may then save metadata for old content 46. That metadata may include data to identify (a) the server from which old content 46 was obtained, (b) the time of creation for old content 46, (c) the time of last access for old content 46, (d) the time of last modification for old content 46, (e) the size (e.g., number of bytes) of old content 46, (f) the author of old content 46, (g) the copyright policy settings specified by the author for old content 46, etc.

Also, as shown at block 416, download manager 44 may automatically add a perceptible watermark to old content 46, to prevent inadvertent or unintentional reuse of old content 46. For example, if old content 46 is an image (e.g., a photograph), download manager 44 may superimpose the following text over a portion of the image: "this is an external image."

As shown at block 418, client DRM engine 40 may then enforce the copyright policy settings for old content 46. In the example scenario, the user of client platform 20 is not the creator of old content 46. However, old shadow image 48 includes copyright policy settings which indicate that the creator of old content 46 has granted permission for others to modify old content 46. The user of client platform 20 may therefore modify old content 46, thereby creating new content 47, as described in greater detail below. However, if the policy settings prohibit others from modifying old content 46, client DRM engine 40 may enforce those restrictions. For example, client DRM engine 40 may save old content 46 as a read only file.

Similarly, if the policy settings prohibit others from downloading old content 46, client DRM engine 40 may enforce those restrictions. For instance, if the user of client platform 20 performs a right-click operation on old content 46, client DRM engine 40 may disable functions such as "save as" and "copy image" in the resulting menu.

Additionally, if a rogue user makes unauthorized changes to a content item and then uploads the modified content item with a corresponding shadow image, the digital rights miner may compare the modified item with the shadow image for the original item to determine that the item has been modified. The miner may then reject the shadow image for the modified item, based on a determination modification was not authorized. As long as a majority of miners do not accept the shadow image for the modified item, the DRM blockchain will not include that shadow image. Consequently, client platforms will be unable to find a shadow image for the modified item, and the client platforms may refuse to download or present content items which have ne corresponding shadow image.

Furthermore, if a user uploads illicit content (e.g., content with unauthorized changes), the original creator, law enforcement personnel, or other interested parties may use DRM blockchain 82 to prove that illicit downloading and/or modification must have happened in order for the content to exist in its compromised state.

As shown at block 420, client DRM engine 40 may then determine whether the user of client platform 20 has modified old content 46, thereby creating new content 47, as indicated above. If the content has been modified, client DRM engine 40 may automatically update the metadata for the content, as shown at block 422. For instance, client DRM engine 40 may add data to the metadata to identify (a) the author of the changes, (b) what exactly has changed, (c) the time of each change, etc. Thus, client DRM engine 40 may register in a file metadata every change that has been made to a file on client platform 20 prior to that file being uploaded to the Internet.

As shown at block 430, upload manager 42 may then determine whether the user is trying to upload new content 47 to a remote device such as server platform 110. As indicated below with regard to block 440, if upload has been requested, upload manager 42 may create new shadow image 49 to facilitate copyright protection for new content 47. However, before creating new shadow image 49, upload manager 42 may determine whether uploading new content 47 would violate any of the copyright policy settings for old content 46. For instance, if old shadow image 48 contains policy settings that prohibit modification of old content 46, upload manager 42 may prevent client platform 20 from uploading any new content based on old content 46. For instance, if a violation is detected, upload manager 42 may present an error message, and the process may then pass from block 431 back to block 410.

If uploading new content 47 would not violate the old policy settings, however, upload manager 42 may obtain new copyright policy settings from the user of client platform 20, as shown at block 432. Additionally, upload manager 42 may limit the kinds of new policy settings that can be selected by the user, based on the policy setting for old content 46. For instance, upload manager 42 may only allow the user to specify new settings that are at least as restrictive as the old settings. For instance, of the old settings indicate that new content may be added but old content may not be removed, upload manager 42 may prevent the user from selecting settings that would allow old content to be removed.

Also, as shown at block 434, upload manager 42 may prompt the user to enter a secret phrase for new content 47. As shown at block 436, upload manager 42 may then add the secret phrase as an invisible part of new content 47. Also, as shown at block 438, upload manager 42 may obtain alert settings from the user.

As shown at block 440, upload manager 42 may then create new shadow image 49. And when creating new shadow image 49, upload manager 42 may include all of the new metadata for the current changes, including the policy and alert settings, etc. Consequently, old shadow image 48 and new shadow image 49 may subsequently be used to determine which parts of the content were created by which author. And if additional changes have been made by additional authors, the shadow images for those changes may also be used to determine which parts of the content were created by which author.

As shown at block 442, after creating new shadow image 49, upload manager 42 may upload new shadow image 49 to miner 80, to be added to DRM blockchain 82. And as shown at block 444, upload manager 42 may then upload new content 47 to server platform 110, for example.

The process may then return to block 410, with client DRM engine 40 continuing to manage downloads and uploads and save metadata for modifications of content, as described above. Furthermore, in one embodiment, when a user attempts to download old content 46, upload manager 42 checks old shadow image 48 before allowing the content to be downloaded. And if the copyright policy settings prohibit the downloading of old content 46, upload manager 42 prevents client platform 20 from downloading old content 46. Thus, upload manager 42 prevents the user from acting contrary to the policy settings.

Server DRM engine 120 may use similar or corresponding operations to manage uploads and downloads from the perspective of server platform 110. For instance, when client platform 20 attempts to upload new content 47 to server platform 110, upload manager 124 may determine whether DRM blockchain 82 contains a shadow image (e.g., new shadow image 48) that corresponds to new content 47. If DRM blockchain 82 does not contain such a shadow image, upload manager 124 may prevent server platform 110 from saving new content 47. Also, if a client platform 20 is attempting to download old content 46 from server platform 110, download manager 124 may determine whether copyright policy settings in old shadow image 48 (from DRM blockchain 82) allow for old content 46 to be downloaded.

If the settings do not allow for downloading, or if old shadow image 48 cannot be found, download manager 124 may prevent server platform 110 from downloading old content 46 to client platform 20.

Figure 4:
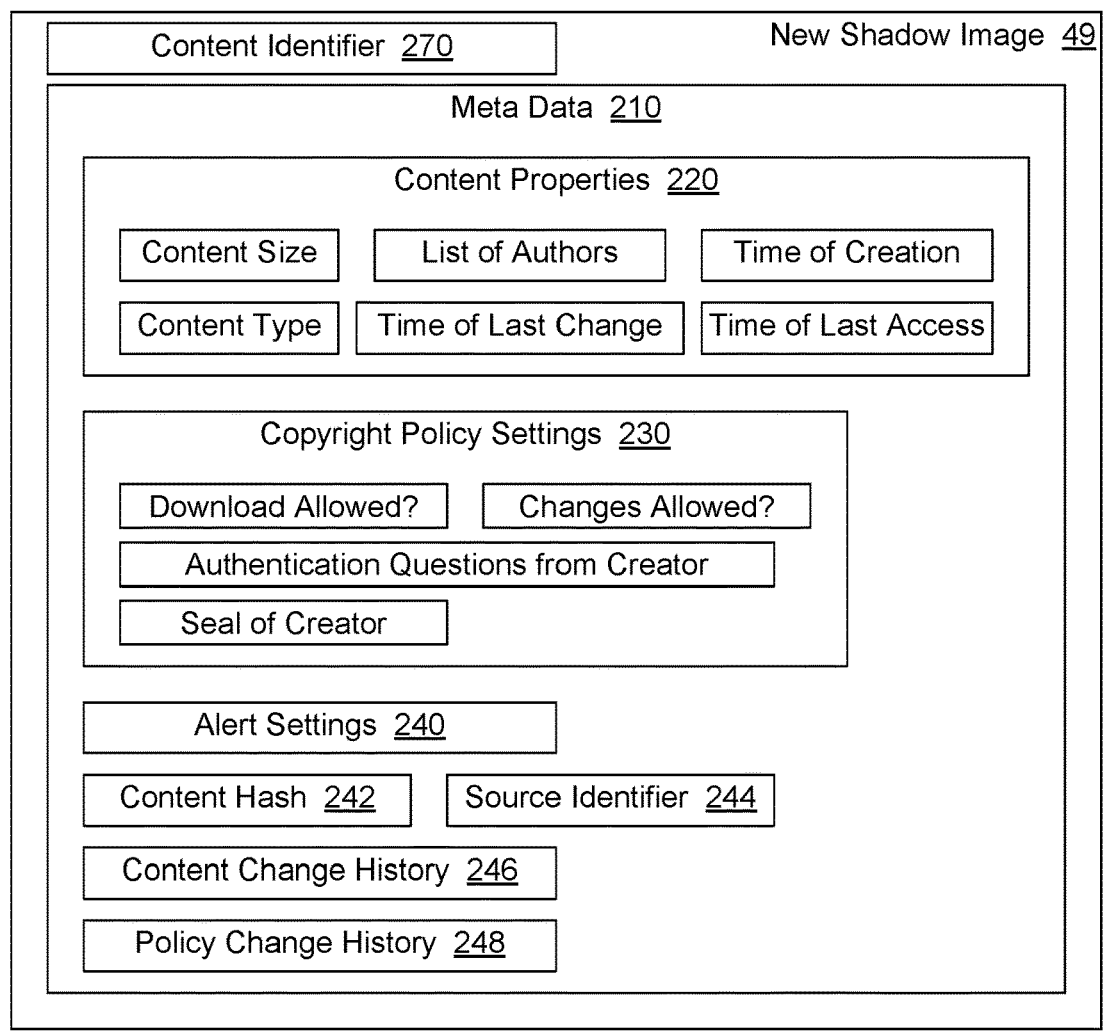
FIG. 4 is a block diagram showing details for an example item of digital content and a corresponding shadow image.
Figure 4:
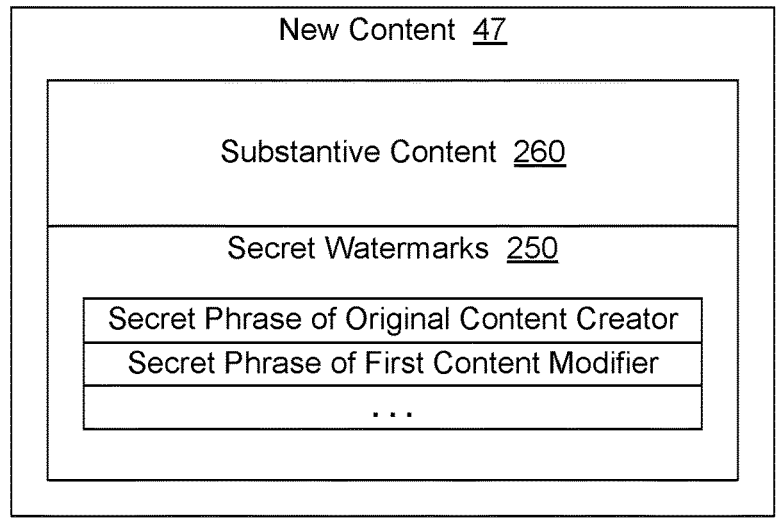

FIG. 4 is a block diagram showing details for an example item of digital content and a corresponding shadow image. In keeping with the scenario described above, FIG. 4 depicts the new content 47 that the user of client platform 20 has created, based on the old content 46 from the user of client platform 70. FIG. 4 also depicts the new shadow image 49 that corresponds to new content 47. As illustrated, new content 47 includes substantive content 260, as well as secret watermarks 250. A content item such as new content 47 may also be referred to as a "content item" or a "content package." Each content package may include a secret phrase or watermark for every user who has contributed to the content, including a secret phrase for the user who created the original content, a secret phrase for the first user who modified that content, etc.

As indicated above, new shadow image 49 may include a content identifier 270 to uniquely identify new content 47, along with metadata 210 to describe various attributes of new content 47. Metadata 210 may indicate, for instance, various file properties or content properties 220, such as the size the content (or the size of the file containing the content), the type of content, the time of creation for the original content, the time that the content was last changed, the time that the content was last accessed. In addition, metadata 210 includes a list of authors, to identify (in order) the original creator and all subsequent contributors, if any. Thus, the list of authors in new shadow image 48 will identify Adam as the first or primary author and Dan as the second author or contributor.

Any suitable type of identifier may be used to identify each author. For instance, if blockchain system 10 requires all users to register with a user identifier (userid), upload manager 42 may add the userid for the current user to the list of authors. In one embodiment, server platform 110 requires each user of KIT to register with a userid, and KIT provides for blockchain-based shadow images to facilitate copyright protection of content as part of the KIT experience. Accordingly, upload manager 42 may utilize the current user's KIT userid when updating the list of authors. Email addresses or any other suitable type of identifier may be used in alternative embodiments.

Metadata 210 may also include copyright policy settings 230. Those settings may indicate whether downloading is allowed, whether changes are allowed, etc. Those settings may also include a seal to prevent the settings form being changed, and that seal may be digitally signed by the original creator or author, for instance. Those settings may also include authentication questions specified by the original creator to enable the original creator to authenticate himself or herself, to enable the creator to modify the settings, while preventing anyone who is unable to answer those questions from modifying the settings.

Metadata 210 may also include alert settings 240 to indicate the conditions under which the author or authors of new content 47 should be notified, with regard to usage of new content 47 by others. Metadata 210 may also include a content hash 242 to represent or summarize the data which constitutes substantive content 260. Metadata 210 may also include a source identifier 244 to identify the location or user from which client platform 20 obtained old content 46. For instance, source identifier 244 may use EXIF to store global positioning system (GPS) coordinates associated with new content 47. Metadata 210 may also include change history data. That change history data may include a content change history 246 to describe all of the changes in new content 47, relative to old content 46. That change history data may also include a policy change history 248 to describe all policy changes for new content 47, relative to the policy settings for old content 46.

In addition, client DRM engine 40 may notify the author of content in response to detecting the secret watermark for that author on the Internet. For instance, as described in greater detail below, client DRM engine 40 may interface with web search tools that automatically search for secret watermarks.

As has been described, in one embodiment, a client DRM engine intercepts and tracks every file that a client platform downloads from a remote device and every file that the client platform uploads to a remote device. In addition, the client DRM engine intercepts and tracks every unstructured content item that the client platform downloads from a remote device and every unstructured content item that the client platform uploads to a remote device. For instance, as indicated above, the client DRM engine may sample a data stream in real time by selecting a frame or block from the stream according to a predetermined sampling protocol and computing the hash of that frame or block. In addition, a string of such hash values can be compared to reference content item that is hashed using the same sampling protocol, to determine whether or not the content item in the data stream matches the reference content item.

The client DRM engine may also use a DRM blockchain for step-by-step file state registration and step-by-step author registration. The DRM blockchain may therefore document every change to the content, as well as the user responsible for each of those changes. The client DRM engine may also enforcement policies that each author has applied to the content created by that author. The client DRM engine may also automatically add perceptible or visible watermarks to downloaded content, to prevent accidental copyright infringement. The client DRM engine may also add invisible digital watermarks to content, for file authentication and file tracking in search engine alerts.

The present teachings address at least three challenges associated with copyright protection: documenting authorship of an original work, documenting authorship of changes to content, and prevention of accidental infringement. As indicated above, a background agent may intercept every content item that network users upload to the Internet, and every content item that the network users download from the Internet. All of the network content may thus be documented and labeled.

As indicated above, to protect content producers and content users from accidental copyright infringement, the client DRM engine may use a shadow image to attach or associate a set of copyright policies to content before the content is uploaded to the Internet, and the client DRM engine may enforce those policies when content is downloaded to a client device. Also, for every change that is made to downloaded content, the client DRM engine may register those changes in metadata that is saved in a DRM blockchain. The client DRM engine may also embed the name of author of content in metadata associated with that content, and the client DRM engine may use the DRM blockchain to track the original content and any modifications to that content.

When content arrives on a server (e.g., in the cloud), the content as already associated with a shadow image that carries the authorship. All of the shadow images in the DRM blockchain associated with a particular item of content may be reviewed to determine all of the authors who contributed to that content. A user who downloads content may therefore obtain a list of the previous content creators. In addition, since each change is recorded in order and timestamped, a user may undo or retract those changes, to recreate earlier versions of the content, all the way back to the original content. And the content hashes in the shadow images may be used to verify that the state of the content has been accurately recreated at each stage. A device may also use the shadow images in the DRM blockchain to determine who are the authors or author for each stage. Also, if two different users make different changes to the same original content, the shadow images may be used to determine whether both users started with the same content, and to determine the sequence of changes that each user performed.

Also, as has been described, user-defined copyright policy settings (e.g. do not download, do not change) are saved in the DRM blockchain before the corresponding content is uploaded to the Internet. The DRM blockchain lists the first content producer as the principal creator or author. Additionally, the principal author predefines the initial set of file policies, and the principal author may seal those policies with his or her digital signature. Users who subsequently change the content are added as contributors and listed, in order, in the list of authors.

The client DRM engine may allow subsequent co-authors to change copyright policy settings, but only (a) if the principal author does not seal or lock the list of policies or (b) if the changes are more restrictive. In one embodiment, if the principal author locks the list of file policies then they cannot be changed by any other user. Access to edit the list of policies remains to the principal author only. Additionally, the client DRM engine may provide an option for the principal author to unlock and change the list of policies if he or she answers one or more authentication questions. The principal author may select those questions and supply the correct answers when the principle author seals the policy settings, before uploading the original content, as indicated above. Those questions may ask for the name of a favorite pet, the name of a first pet, the first name of a grandmother, etc.

The client DRM engine may also prevent everyone but the principal author from locking or sealing the policy settings. Also, the client DRM engine saves the policy change history for each policy change for each content item in the DRM blockchain. The history for each policy change may also identify the user who made the change. Anyone who is interested may use the DRM blockchain to review all of the policy changes. Anyone who is interested may also use the DRM blockchain to review all of the content changes and to review the identification information for each author or contributor.

The client DRM engine may also enable each author or contributor to subscribe to content alerts.

If a user downloads and modifies content, but then the client DRM engine fails to update the DRM blockchain with the shadow image for the modified content, then the changes may effectively be lost. For instance, as indicated above, before downloading a content item, or before allowing a user to access a downloaded content item, all client DRM engines may check for a valid shadow image in the DMR blockchain for that content item. If a client platform uploads content to a server without adding a corresponding shadow image to the DRM blockchain, no client platforms will be able to verify the content, because no client platforms will be able to locate the corresponding shadow image.

As indicated above, the client DRM engine may also automatically add visible watermarks to downloaded content whenever a file or other content arrives at the client platform, to help prevent inadvertent reuse.

As indicated above, the client DRM engine may also enable the user to establish alert settings to control notifications concerning use of content authored by the user. In one embodiment, the client DRM engine includes an agent that runs on the client platform and detects secret watermarks in content in the public domain. A remote server may also provide similar functionality. For instance, an Internet search engine server may allow a user to search for secret watermarks specified by the user. In addition, the client DRM engine may add secret watermarks and metadata during production of content, to create content that can easily be detected by Internet search tools. The client DRM engine may be configured to automatically add secret watermarks whenever the user is creating certain kinds of content (e.g., when the user is using a tool to write a screenplay).

Additionally, the client DRM engine may search the Internet to determine how common certain text phrases, sounds, or visual characteristics are, and the client DRM engine may automatically use the more unusual items of characteristics as the secret watermarks for a content item being produced of uploaded. Secret watermarks may include, without limitation, purposely misspelled metadata, key phrases in text, patterns in ultrasonic frequencies added to a sound track, visually undetectable watermarks in frames of video, or a combination of one or more of the previous items or other items. The client DRM engine may also establish a baseline for the existence of key phrases and watermarks in public content before the user uploads the content. Then if there is a spike in search hits later, the client DRM engine can alert the author. In addition or alternatively, the client DRM engine may use machine vision to recognizing objects or patterns in a video stream being produced at various times in the stream. Then, on subsequent searches in the public domain, such patterns of object appearance could be detected in content and treated like a secret watermark, to trigger an alert.

In one embodiment, a secret watermark for a content item is viewable only to the creator of that content item.

Each user may configure the alert settings to subscribe to desired types of alerts for any particular content item contributed to by that user. For instance, the user may select to receive updates in response to the client DRM engine detecting events such as (a) the content item has been changed and the modified content has been uploaded to the Internet, (b) a new co-author has been associated with the original content or with a modified version of the content, (c) the content item has been uploaded to a new server, etc.

This disclosure refers to secret watermarks. Secret watermarks may include, without limitation, data that has been invisibly or imperceptibly added (a) to visual content such as a picture or an image, (b) to audio content, or (c) to content that includes audio and video components.

In one embodiment, shadow images need not provide authenticated attribution for the author or authors. Instead, the author or owner may rely on other evidence, such as a secret watermark, to prove authorship or ownership.

As indicated above, a client DRM engine may use shadow images to bundle policies with content. The client DRM engine may perform such bundling in response to the user selecting an "upload" button or a "submit" button, for instance. In addition, the client DRM engine may use a download manager to scan all browsed content and categorize that content according to labels such as the following:

the content already has rights management policy settings from someone other than the current user;

the content is inappropriate for the current user;

the content is associated with a particular context (e.g. a photo of an incident associated with an unrelated event)

Similarly, the client DRM engine may categorize content that is created on the client platform as new content. In addition, as indicated above, the client DRM engine may enforce policy restrictions within the client platform. For example, the client DRM engine may cause an Internet browser (a) to disable content modification, (b) to disable content redistribution, and (c) to produce an error message or warning if the user tries to perform an inappropriate action to the content. For instance, if the user tries to upload content that is categorized as "for nonprofit use only," the client DRM engine may cause the browser the generate an alert such as the following: "Publishing this content for commercial use would violate the DRM policies for this content and may be punishable by law."

In light of the principles and example embodiments described and illustrated herein, it will be recognized that the illustrated embodiments can be modified in arrangement and detail without departing from such principles. For example, an example scenario involving a single DRM blockchain is described above, but other scenarios may involve multiple DRM blockchains.

For instance, in one embodiment, the blockchain system uses different DRM blockchains for different types of content, such as a video blockchain for video content and an image blockchain for image content. With regard to the video blockchain, streaming video content may rely, for example, on a Motion Pictures Expert Group (MPEG) version 4 (MPEG4) encoding scheme that defines data structures (such as boxes and fields) for recording different types of metadata, including authentication metadata. Those data structures may be used to store metadata descriptors for computing a hash value (e.g., a randomly selected start location within the stream's buffer, a seed for seeding a pseudo-random number generator (PRNG), etc.). Those data structures may also be used to store the hash results and to store the algorithm used to compute the hash (or an identifier for that algorithm).

A verifier may use a seed value to initialize the PRNG, and the verifier may select the block to hash. The dynamically obtained hash may be compared with actual values in the content to determine whether the video has been modified. The PRNG and hash may be included in the metadata field for content type, for instance. A backing blockchain may construct a transaction such that the accumulation of all computed hash values is constructed and stored in the MPEG encoding.

With regard to the image blockchain, the field for content type may use a structure like that used for Joint Photographic Experts Group (jpg) or Portable Network Graphics (png) files. Accordingly, the content type structure may contain Exchangeable Image File Format (EXIF) or other metadata fields where a hash of the content may be stored.

Alternatively, an upload manager may compute hash values over a manifest of webpages, and the upload manager may store an accumulation of such hash values in the manifest. The upload manager may also use a content protection key to sign the manifest with the accumulated hash values. The upload manager may store the signed manifest in a shadow image that is contributed to a DRM blockchain.

Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Any suitable operating environment and programming language (or combination of operating environments and programming languages) may be used to implement components described herein.

Some devices may include software which executes on one or more processors. The software may include, for example, an OS, a virtual machine monitor (VMM), and applications such as a client DRM engine, a server DRM engine, etc. A device may also include storage and main memory. Software and other data may be copied from the storage into the memory. The processor may then execute the software from memory.

Alternative embodiments also include machine accessible media encoding instructions or control logic for performing the operations described herein. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an ASIC, etc.).

In at least one embodiment, the instructions for all relevant components may be stored in one non-transitory machine accessible medium. In at least one other embodiment, two or more non-transitory machine accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices. For instance, as indicated above, the rights mining software to add shadow images to the DRM blockchain may reside on the client platform that is uploading the content. In addition or alternatively, the rights mining software 84 may reside on the server platform that is receiving the content from the client platform.

The present teachings may be used to advantage in many different kinds of data processing systems. Example data processing systems may include, without limitation, systems on a chip (SoCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a client platform to support digital rights management. The client platform comprises a processor, at least one machine-accessible storage medium responsive to the processor, and a DRM engine in the machine-accessible storage medium. The DRM engine, when executed by the processor, enables the client platform to monitor download operations performed by the client platform and, in response to an operation to download a digital content item from a remote source, to obtain a shadow image for the digital content item from a DRM blockchain. The shadow image comprises (a) a hash of the digital content item and (b) copyright policy settings to indicate security constraints for the digital content item. After the shadow image for the digital content item is obtained, the DRM engine enables the client platform to automatically determine whether the copyright policy settings for the digital content item allow modification of the digital content item. The DRM engine enables a user of the client platform to create a modified version of the digital content item only if the copyright policy settings allow modification of the digital content item.

Example A2 is client platform according to Example A1, wherein the DRM engine, when executed by the processor, further enables the client platform to create a new shadow image for a modified version of the digital content item, after the user creates the modified version of the digital content item. The new shadow image comprises a hash of the modified version of the digital content item. The DRM engine also enables the client platform to generate a blockchain transaction for the DRM blockchain, wherein the blockchain transaction includes the new shadow image. The DRM engine also enables the client platform to automatically transmit the blockchain transaction to at least one node associated with the DRM blockchain, in response to detecting an upload operation to upload the modified version of the digital content item from the client platform to a remote destination. The blockchain transaction is to enable the new shadow image to be included in a new block for the DRM blockchain by a digital rights miner.

Example A3 is client platform according to Example A2, wherein the new shadow image further comprises (a) change history data describing changes in the modified version of the digital content item, relative to a previous version of the digital content item; (b) a timestamp to indicate when the modified version of the digital content item was last modified; and (c) an author identifier to identify the user who created the modified version of the digital content item.

Example A4 is client platform according to Example A2, wherein the DRM engine, when executed by the processor, further enables the client platform to automatically add a secret watermark to the modified version of the digital content item, the secret watermark being suitable to serve as evidence of authorship for the modified version of the digital content item. Example A4 may also include the features of Example A3.

Example A5 is client platform according to Example A4, wherein the DRM engine, when executed by the processor, further enables the client platform to prompt the user to enter a secret phrase in response to detecting an upload request. Also, the secret watermark is based at least in part on the secret phrase.

Example A6 is client platform according to Example A1, wherein the digital content item comprises content from a first author and content from a second author. In addition, the digital content item a first secret watermark based on authentication information provided by the first author and a second secret watermark based on authentication information provided by the second author. Example A6 may also include the features of any one or more of Examples A2 through A5.

Example A7 is client platform according to Example A1, wherein the DRM engine, when executed by the processor, further enables the client platform to automatically add a perceptible watermark to the digital content item in response to download of the digital content item from the remote source. Example A7 may also include the features of any one or more of Examples A2 through A6.

Example B1 is an apparatus to support digital rights management. The apparatus comprises at least one non-transitory machine-accessible storage medium and a DRM engine in the machine-accessible storage medium. The DRM engine, when executed by a processor of a client platform, enables the client platform to monitor download operations performed by the client platform and, in response to an operation to download a digital content item from a remote source, to obtain a shadow image for the digital content item from a DRM blockchain. The shadow image comprises (a) a hash of the digital content item and (b) copyright policy settings to indicate security constraints for the digital content item. After obtaining the shadow image for the digital content item, the DRM engine enables the client platform (a) to automatically determine whether the copyright policy settings for the digital content item allow modification of the digital content item and (b) to enable a user of the client platform to create a modified version of the digital content item only if the copyright policy settings allow modification of the digital content item.

Example B2 is an apparatus according to Example B1, wherein the DRM engine, when executed by the processor, further enables the client platform to create a new shadow image for the modified version of the digital content item, after the user creates the modified version of the digital content item. The new shadow image comprises a hash of the modified version of the digital content item. The DRM engine, when executed by the processor, further enables the client platform (a) to generate a blockchain transaction for the DRM blockchain, wherein the blockchain transaction includes the new shadow image; and (b) in response to detecting an upload operation to upload the modified version of the digital content item from the client platform to a remote destination, to automatically transmit the blockchain transaction to at least one node associated with the DRM blockchain. The blockchain transaction is to enable the new shadow image be included in a new block for the DRM blockchain by a digital rights miner.

Example B3 is an apparatus according to Example B2, wherein the new shadow image further comprises (a) change history data describing changes in the modified version of the digital content item, relative to a previous version of the digital content item; (b) a timestamp to indicate when the modified version of the digital content item was last modified; and (c) an author identifier to identify the user who created the modified version of the digital content item.

Example B4 is an apparatus according to Example B2, wherein the DRM engine, when executed by the processor, further enables the client platform to automatically add a secret watermark to the modified version of the digital content item, the secret watermark being suitable to serve as evidence of authorship for the modified version of the digital content item.

Example B4 may also include the features of Example B3.

Example B5 is an apparatus according to Example B4, wherein the DRM engine, when executed by the processor, further enables the client platform to prompt the user to enter a secret phrase in response to detecting an upload request. Also, the secret watermark is based at least in part on the secret phrase.

Example B6 is an apparatus according to Example B1, wherein the digital content item comprises content from a first author and content from a second author; and the digital content item comprises a first secret watermark based on authentication information provided by the first author and a second secret watermark based on authentication information provided by the second author. Example B6 may also include the features of any one or more of Examples B2 through B5.

Example B7 is an apparatus according to Example B1, wherein the DRM engine, when executed by the processor, further enables the client platform to automatically add a perceptible watermark to the digital content item in response to download of the digital content item from the remote source. Example B7 may also include the features of any one or more of Examples B2 through B6.

Example C1 is a method to support digital rights management. The method comprises, at a client platform, monitoring download operations performed by the client platform, and in response to an operation to download a digital content item from a remote source, obtaining a shadow image for the digital content item from a DRM blockchain. The shadow image comprises (a) a hash of the digital content item and (b) copyright policy settings to indicate security constraints for the digital content item. The method further comprises, after obtaining the shadow image for the digital content item, automatically determining whether the copyright policy settings for the digital content item allow modification of the digital content item. The method further comprises enabling a user of the client platform to create a modified version of the digital content item only if the copyright policy settings allow modification of the digital content item.

Example C2 is a method according to Example C1, further comprising, after the user creates the modified version of the digital content item, creating a new shadow image for the modified version of the digital content item. The new shadow image comprises a hash of the modified version of the digital content item. The method further comprises generating a blockchain transaction for the DRM blockchain, wherein the blockchain transaction includes the new shadow image. The method further comprises, in response to detecting an upload operation to upload the modified version of the digital content item from the client platform to a remote destination, automatically transmitting the blockchain transaction to at least one node associated with the DRM blockchain, to enable the new shadow image be included in a new block for the DRM blockchain by a digital rights miner.

Example C3 is a method according to Example C2, wherein the new shadow image further comprises (a) change history data describing changes in the modified version of the digital content item, relative to a previous version of the digital content item; (b) a timestamp to indicate when the modified version of the digital content item was last modified; and (c) an author identifier to identify the user who created the modified version of the digital content item.

Example C4 is a method according to Example C2, further comprising automatically adding a secret watermark to the modified version of the digital content item, the secret watermark being suitable to serve as evidence of authorship for the modified version of the digital content item. Example C4 may also include the features of Example C3.

Example C5 is a method according to Example C4, further comprising (a) prompting the user to enter a secret phrase in response to detecting an upload request, and (b) generating the secret watermark based at least in part on the secret phrase.

Example C6 is a method according to Example C1, wherein the digital content item comprises content from a first author and content from a second author, and the digital content item comprises a first secret watermark based on authentication information provided by the first author and a second secret watermark based on authentication information provided by the second author. Example C6 may also include the features of any one or more of Example C2 through C5.

Example C7 is a method according to Example C1, further comprising automatically adding a perceptible watermark to the digital content item in response to download of the digital content item from the remote source. Example C7 may also include the features of any one or more of Example A2 through A6.

Example D1 is a method to support digital rights management. The method comprises, at a client platform, monitoring upload operations performed by the client platform. The method further comprises, in association with an operation to upload a digital content item from the client platform to a remote destination, performing operations comprising: (a) generating a hash of the digital content item; (b) prompting a user of the client platform to specify copyright policy settings to indicate security constraints for the digital content item; (c) generating a shadow image for the digital content item, wherein the shadow image comprises (i) the hash of the digital content item and (ii) the copyright policy settings for the digital content item; (d) generating a blockchain transaction for a DRM blockchain, wherein the blockchain transaction includes the shadow image; (e) automatically transmitting the blockchain transaction to at least one node associated with the DRM blockchain, to enable the new shadow image be included in a new block for the DRM blockchain by a digital rights miner; and (f) allowing the client platform to upload the digital content item to the remote destination.

Example D2 is a method according to Example D1, wherein the operations of (a) generating the hash of the digital content item, (b) prompting the user to specify copyright policy settings to indicate security constraints for the digital content item, (c) generating the shadow image for the digital content item, (d) generating the blockchain transaction for a DRM blockchain, and (e) automatically transmitting the blockchain transaction to at least one node associated with the DRM blockchain are performed in response to the operation to upload the digital content item to the remote destination.

Example D3 is a method according to Example D1, further comprising, if the user of the client platform is not an original author of the digital content item, automatically determining whether copyright policy settings in a current shadow image for the digital content item authorize the user of the client platform to share the digital content item. Also, the operation of allowing the client platform to upload the digital content item to the remote destination is performed only if the copyright policy settings in the current shadow image for the digital content item authorize the user of the client platform to share the digital content item. Example D3 may also include the features of Example D2.

Example D4 is a method according to Example D1, wherein (a) the client platform comprises a first client platform; (b) the digital content item comprises content that is to be provided to a second client platform as unstructured content; and (c) the shadow image enables the second client platform to determine the copyright policy settings specified for the digital content item by the user of the first client platform. Example D4 may also include the features of any one or more of Example D2 through D3.

Example E1 is a blockchain system to support digital rights management. The blockchain system comprises a first client platform with a first digital rights management (DRM) engine that enables the first client platform to perform the method of Example C1. The blockchain system further comprises a second client platform with a second DRM engine that enables the second client platform the method of Example D1.

Example E2 is a blockchain system according to Example E1, further comprises a server platform to receive the digital content item from the second client platform and to provide the digital content item to the first client platform.

Example E3 is a blockchain system according to Example E2, further comprising a digital rights miner to perform operations comprising (a) receiving the blockchain transaction with the shadow image, and (b) adding the shadow image to the DRM blockchain.

Example F is at least one machine-accessible medium comprising computer instructions to support digital rights management. The computer instructions, in response to being executed by a data processing system, enable the data processing system to perform a method according to any of Examples C1 through C7 and D1 through D4.

Example G is a data processing system with technology to support digital rights management. The data processing system comprises a processing element, at least one machine-accessible medium responsive to the processing element, and computer instructions stored at least partially in the at least one machine-accessible medium. The computer instructions, in response to being executed, enable the data processing system to perform a method according to any of Examples C1 through C7 and D1 through D4.

Example H is a data processing system with technology to support digital rights management. The data processing system comprises means for performing the method of any one of Examples C1 through C7 and D1 through D4.

What is claimed is:

1. A client platform to support digital rights management, the client platform comprising:
    a processor;
    at least one machine-accessible storage medium responsive to the processor; and
    a digital rights management (DRM) engine in the machine-accessible storage medium, wherein the DRM engine, when executed by the processor, enables the client platform to:
        monitor download operations performed by the client platform;
        in response to an operation to download a digital content item from a remote source, obtain a shadow image for the digital content item from a DRM blockchain, wherein the shadow image comprises (a) a hash of the digital content item and (b) copyright policy settings to indicate security constraints for the digital content item;

after obtaining the shadow image for the digital content item, automatically determine whether the copyright policy settings for the digital content item allow modification of the digital content item; and enable a user of the client platform to create a modified version of the digital content item only if the copyright policy settings allow modification of the digital content item.

2. A client platform according to claim 1, wherein the DRM engine, when executed by the processor, further enables the client platform to:

after the user creates the modified version of the digital content item, create a new shadow image for the modified version of the digital content item, wherein the new shadow image comprises a hash of the modified version of the digital content item;

generate a blockchain transaction for the DRM blockchain, wherein the blockchain transaction includes the new shadow image; and in response to detecting an upload operation to upload the modified version of the digital content item from the client platform to a remote destination, automatically transmit the blockchain transaction to at least one node associated with the DRM blockchain, to enable the new shadow image be included in a new block for the DRM blockchain by a digital rights miner.

3. A client platform according to claim 2, wherein the new shadow image further comprises:

change history data describing changes in the modified version of the digital content item, relative to a previous version of the digital content item;

a timestamp to indicate when the modified version of the digital content item was last modified; and an author identifier to identify the user who created the modified version of the digital content item.

4. A client platform according to claim 2, wherein the DRM engine, when executed by the processor, further enables the client platform to automatically add a secret watermark to the modified version of the digital content item, the secret watermark being suitable to serve as evidence of authorship for the modified version of the digital content item.

5. A client platform according to claim 4, wherein:

the DRM engine, when executed by the processor, further enables the client platform to prompt the user to enter a secret phrase in response to detecting an upload request; and the secret watermark is based at least in part on the secret phrase.

6. A client platform according to claim 1, wherein:

the digital content item comprises content from a first author and content from a second author; and the digital content item comprises a first secret watermark based on authentication information provided by the first author and a second secret watermark based on authentication information provided by the second author.

7. A client platform according to claim 1, wherein the DRM engine, when executed by the processor, further enables the client platform to automatically add a perceptible watermark to the digital content item in response to download of the digital content item from the remote source.

8. An apparatus to support digital rights management, the apparatus comprising:

at least one non-transitory machine-accessible storage medium; and a digital rights management (DRM) engine in the machine-accessible storage medium, wherein the DRM engine, when executed by a processor of a client platform, enables the client platform to:

monitor download operations performed by the client platform;

in response to an operation to download a digital content item from a remote source, obtain a shadow image for the digital content item from a DRM blockchain, wherein the shadow image comprises (a) a hash of the digital content item and (b) copyright policy settings to indicate security constraints for the digital content item;

after obtaining the shadow image for the digital content item, automatically determine whether the copyright policy settings for the digital content item allow modification of the digital content item; and enable a user of the client platform to create a modified version of the digital content item only if the copyright policy settings allow modification of the digital content item.

9. An apparatus according to claim 8, wherein the DRM engine, when executed by the processor, further enables the client platform to:

after the user creates the modified version of the digital content item, create a new shadow image for the modified version of the digital content item, wherein the new shadow image comprises a hash of the modified version of the digital content item;

generate a blockchain transaction for the DRM blockchain, wherein the blockchain transaction includes the new shadow image; and in response to detecting an upload operation to upload the modified version of the digital content item from the client platform to a remote destination, automatically transmit the blockchain transaction to at least one node associated with the DRM blockchain, to enable the new shadow image be included in a new block for the DRM blockchain by a digital rights miner.

10. An apparatus according to claim 9, wherein the new shadow image further comprises:

change history data describing changes in the modified version of the digital content item, relative to a previous version of the digital content item;

a timestamp to indicate when the modified version of the digital content item was last modified; and an author identifier to identify the user who created the modified version of the digital content item.

11. An apparatus according to claim 9, wherein the DRM engine, when executed by the processor, further enables the client platform to automatically add a secret watermark to the modified version of the digital content item, the secret watermark being suitable to serve as evidence of authorship for the modified version of the digital content item.

12. An apparatus according to claim 11, wherein:

the DRM engine, when executed by the processor, further enables the client platform to prompt the user to enter a secret phrase in response to detecting an upload request; and the secret watermark is based at least in part on the secret phrase.

13. An apparatus according to claim 8, wherein:

the digital content item comprises content from a first author and content from a second author; and the digital content item comprises a first secret watermark based on authentication information provided by the first author and a second secret watermark based on authentication information provided by the second author.

14. An apparatus according to claim 8, wherein the DRM engine, when executed by the processor, further enables the client platform to automatically add a perceptible watermark to the digital content item in response to download of the digital content item from the remote source.

15. A method to support digital rights management, the method comprising:
   at a client platform, monitoring download operations performed by the client platform;
   in response to an operation to download a digital content item from a remote source, obtaining a shadow image for the digital content item from a DRM blockchain, wherein the shadow image comprises (a) a hash of the digital content item and (b) copyright policy settings to indicate security constraints for the digital content item;
   after obtaining the shadow image for the digital content item, automatically determining whether the copyright policy settings for the digital content item allow modification of the digital content item; and
   enabling a user of the client platform to create a modified version of the digital content item only if the copyright policy settings allow modification of the digital content item.

16. A method according to claim 15, further comprising:
   after the user creates the modified version of the digital content item, creating a new shadow image for the modified version of the digital content item, wherein the new shadow image comprises a hash of the modified version of the digital content item;
   generating a blockchain transaction for the DRM blockchain, wherein the blockchain transaction includes the new shadow image; and
   in response to detecting an upload operation to upload the modified version of the digital content item from the client platform to a remote destination, automatically transmitting the blockchain transaction to at least one node associated with the DRM blockchain, to enable the new shadow image be included in a new block for the DRM blockchain by a digital rights miner.

17. A method according to claim 16, wherein the new shadow image further comprises:
   change history data describing changes in the modified version of the digital content item, relative to a previous version of the digital content item;
   a timestamp to indicate when the modified version of the digital content item was last modified; and
   an author identifier to identify the user who created the modified version of the digital content item.

18. A method according to claim 16, further comprising:
   automatically adding a secret watermark to the modified version of the digital content item, the secret watermark being suitable to serve as evidence of authorship for the modified version of the digital content item.

19. A method according to claim 18, further comprising:
   prompting the user to enter a secret phrase in response to detecting an upload request; and
   generating the secret watermark based at least in part on the secret phrase.

20. A method according to claim 15, wherein:
   the digital content item comprises content from a first author and content from a second author; and
   the digital content item comprises a first secret watermark based on authentication information provided by the first author and a second secret watermark based on authentication information provided by the second author.

21. A method according to claim 15, further comprising:
   automatically adding a perceptible watermark to the digital content item in response to download of the digital content item from the remote source.

\* \* \* \* \*